Sept. 20, 1927.

W. C. RASTETTER

Re. 16,742

FOLDING CHAIR

Original Filed Sept. 30, 1924

William C. Rastetter INVENTOR

BY

H. G. Burns ATTORNEY

Reissued Sept. 20, 1927. Re. 16,742

UNITED STATES PATENT OFFICE.

WILLIAM C. RASTETTER, OF FORT WAYNE, INDIANA.

FOLDING CHAIR.

Original No. 1,583,491, dated May 4, 1926, Serial No. 740,758, filed September 30, 1924. Application for reissue filed March 10, 1927. Serial No. 174,383.

This invention relates to improvements in folding chairs and the object thereof is to provide in a folding chair a flexible back so connected with the folding supports of the chair as to become moved into extended position without affecting its rigid connection with the chair frame.

This object is accomplished by the construction illustrated in the accompanying drawings, in which:—

The characters appearing in the description refer to parts shown in the drawings and designated thereon by corresponding characters.

Figure 1:
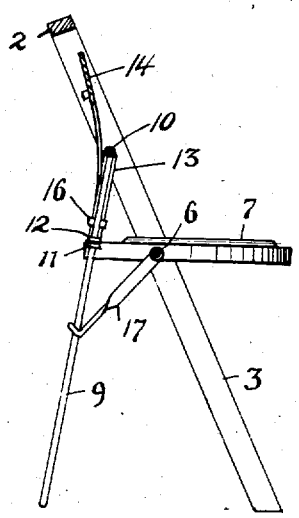
Fig. 1 is a side elevation of a structure embodying the invention, a portion thereof being in section.
Figure 2:
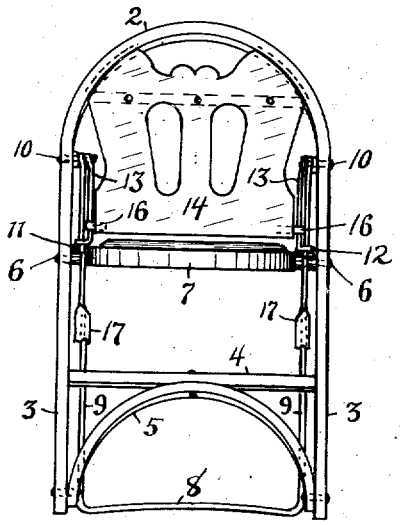
Fig. 2 is a front elevation projected from Fig. 1.
Figure 3:
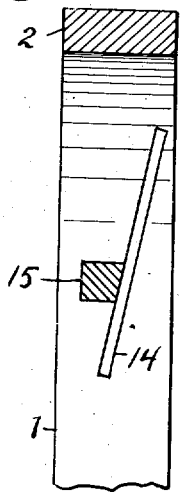
Fig. 3 is a fragmentary detail view showing a section of the chair frame.
Figure 4:
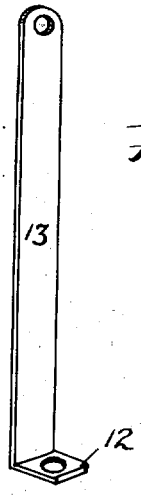
Fig. 4 is a perspective view of a stop, used also as a guide, included in the structure.
Figure 5:
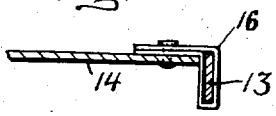
Fig. 5 is a detail view of one of the connections between the back and corresponding guide.
Figure 6:
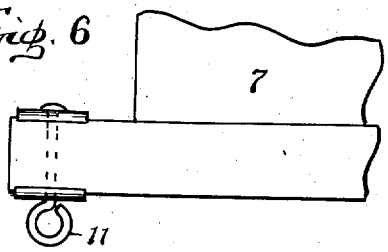
Fig. 6 is a detail plan view showing a portion of the seat.

The invention comprises a main frame preferably formed of a wooden strip 1 bent in its middle to form a bow 2, with contiguous parallel legs 3, there being a cross-piece 4 and bracket 5 connecting the legs at their lower ends.

Supported between the legs is a horizontal rod 6 upon which is pivotally mounted a seat 7, and also in the frame is pivotally secured a folding support therefor consisting of a U-shaped prop formed of a rod 8 shaped so as to have upwardly extending arms 9 which are respectively pivoted at their upper ends to the corresponding sides of the frame as indicated by 10. The back end of the seat 7 has at each side thereof an eyebolt 11 through which the corresponding arm 9 of the prop extends, the eyebolts being slidable on the arms and limited in their upper movement by corresponding stops 12 on said arms. The shank 13 of each stop is secured at its upper end by the pivot 10 with which the corresponding arm 9 is secured to the frame, the shank being disposed in a plane parallel with the arm.

In the upper part of the main frame at each side of the loop thereof, extending through the inner face of the strip forming the frame, is made a kerf 14′ diagonally disposed and extending downwardly from a point at its top near the front face of the frame. In said kerfs are secured corresponding upper portions of a back 14 that is formed preferably of a single plate of laminated wood fashioned in suitable design, there being a fulcrum bar 15 laterally disposed and secured in the frame adjacent said kerfs spaced from the top of the back and against which the back 14 bears permanently. In this manner the upper part of the back 14 is firmly and rigidly fixed in connection with the frame. At the lower end of the back 14 at each side thereof is fixed a loop 16 that encompasses the corresponding guide 13 upon which the loop has vertical sliding movement. By this construction the back becomes bowed forwardly and is thus held, through action of the folding support when it is extended to its position for use.

Upon the rod 6 between each side of the seat and the corresponding leg of the frame is pivoted a brace 17 that has limited sliding movement on the corresponding arm 9 of the prop, which braces serve to sustain the prop when in extended position.

In the operation of the invention, the seat is swung upon the rod 6 to a horizontal position which has the effect of swinging the prop, through its connections with the eyebolts on the seat, to sustaining position. As the prop is swung rearwardly, the guides 13 are accordingly moved so that the lower end of the back through its loop connections with said guides is moved rearwardly while the upper end of the back is held firmly in the frame and sustained by the fulcrum bar. In this manner upon extension of the folding support to position for use, the back is flexed forwardly so as to present a convex front that lends gracefulness to its appearance and which fits into the curvature of the back of the occupant with attendant comfort.

What I claim is:—

1. In a folding chair, a main frame including a pair of legs spaced apart; a rod horizontally positioned with its ends secured to the corresponding legs; a seat pivotally supported on the rod; a prop member having arms, the upper ends of which are pivoted in the frame at points above said rod; a sliding connection on said arms secured to the rear end of the seat; a stop fixed on each arm operable to limit upward movement of said sliding connections; a vertically disposed guide in connection with the upper part of each of said arms; a fulcrum bar transversely disposed in the upper part of the chair frame; and a bendable back member secured at its upper part in the frame and bearing upon the fulcrum bar, and having sliding connections respectively at its lower end with said guides, said back assuming a flat plane when the chair is folded and a forwardly curved plane when the chair is extended for use.

2. In a folding chair having a main frame in supported connection with a hinged prop and a seat pivotally supported in the frame having limited sliding connection with the prop, a fulcrum bar transversely disposed in the upper part of the frame; vertically disposed guides on said prop; and a bendable back member rigidly secured at its upper part in the frame, bearing upon the fulcrum bar and having sliding connections at its lower end with the respective guides.

3. In a folding chair having a main frame with a prop in hinged connection therewith and a folding seat, the prop including guides thereon, a fulcrum bar transversely disposed in the upper part of the frame; and a bendable back member rigidly secured to the frame and fulcrum bar, and having sliding connections with the respective guides, said back extending in a flat plane when the chair is folded and having a forwardly disposed curvature when the chair is extended for use.

4. A folding chair comprising a main frame constituting forelegs; a folding support for said frame constituting rear legs; a tilting seat in said frame having operable relation with said support; and a bendable back of spring material rigidly supported at its upper portion in said main frame, said folding support having operable relation with the lower portion of said back whereby said back is bowed so as to present a convex front when the support is extended for use.

5. A folding chair comprising a main frame constituting forelegs, a folding support for said frame constituting rear legs; a tilting seat in said frame having operable relation with said support; a bendable back of spring material rigidly supported at its upper portion in said main frame; and a connection between the lower portion of said back and folding support whereby said back is bowed so as to present a convex front when the support is extended for use.

6. A collapsible chair consisting of a main frame constituting forelegs, a folding element including a seat and rear legs, and a bendable back of spring material rigidly supported at its upper portion in said frame and having connection at its lower portion with said element whereby said back is bowed and presents a convex front when the folding element is extended for use.

7. In a collapsible chair, a main frame, a foldable support and seat connected to the main frame, a flexible back of spring material connected to the main frame, and means whereby upon extension of the support, the back is flexed forwardly so as to fit in the inward curvature of the back of the occupant and is held in its said flexed position against movement upon pressure being exerted thereon by the back of the occupant.

In testimony whereof I affix my signature.

WILLIAM C. RASTETTER.